United States Patent [19]

Suzuki

[11] 4,072,514

[45] Feb. 7, 1978

[54] MAGNESIUM COMPOSITES AND MIXTURES FOR HYDROGEN GENERATION AND METHOD FOR MANUFACTURE THEREOF

[76] Inventor: Masahiro Suzuki, 423, Yasaka, Kakegawa, Shizuoka, Japan

[21] Appl. No.: 665,115

[22] Filed: Mar. 8, 1976

Related U.S. Application Data

[60] Division of Ser. No. 451,141, March 14, 1974, Pat. No. 3,957,483, which is a continuation-in-part of Ser. No. 242,790, April 10, 1972, abandoned.

[30] Foreign Application Priority Data

Apr. 20, 1971 Japan .................................. 46-10288

[51] Int. Cl.$^2$ ......................... C22C 23/00; C01B 1/07
[52] U.S. Cl. .................................... 75/168 R; 75/135; 423/657
[58] Field of Search ........................... 75/.5 R, 168 R; 423/657

[56] References Cited

U.S. PATENT DOCUMENTS

| | | | |
|---|---|---|---|
| 2,623,812 | 12/1952 | Eborall et al. ....................... | 423/657 |
| 3,540,854 | 11/1970 | Brooke, Jr. et al. ................ | 423/657 |
| 3,985,865 | 10/1976 | Hohne .................................. | 423/657 |
| 3,985,866 | 10/1976 | Oda et al. ............................ | 423/657 |

*Primary Examiner*—W. Stallard
*Attorney, Agent, or Firm*—Oblon, Fisher, Spivak, McClelland & Maier

[57] ABSTRACT

Magnesium composites and mixtures prepared in accordance with the method herein disclosed readily induce vigorous generation of hydrogen upon introduction into water. Magnesium composites having iron, zinc, chromium, aluminum and manganese attached in a finely divided form to the surface of magnesium articles are produced by causing said finely divided metals to adhere to the surface of magnesium articles by virtue of application of mechanical pressure. Magnesium mixtures having the said finely divided metals dispersed in magnesium articles are produced by melting magnesium, adding the said metals in a finely divided form to the molten magnesium and allowing the resultant mixtures to cool.

2 Claims, No Drawings

MAGNESIUM COMPOSITES AND MIXTURES FOR HYDROGEN GENERATION AND METHOD FOR MANUFACTURE THEREOF

REFERENCE TO COPENDING APPLICATION:

This is a division of application Ser. No. 451,141 filed Mar. 14, 1974, and now U.S. Pat. No. 3,957,483 which is a continuation-in-part of Ser. No. 242,790, filed Apr. 10, 1972, and now abandoned.

BACKGROUND OF THE INVENTION:

In recent years, hydrogen has attracted attention as a potential fuel. On combustion, hydrogen does not produce substances which are liable to pollute the atmosphere such as, for example, sulfur oxides and nitrogen oxides. It is safe unless it is handled carelessly, and it possesses outstanding properties as a fuel. For the production of hydrogen, there have heretofore been developed methods involving operations on a large commercial scale such as, for example, the method resorting to the electrolysis of water, the method relying upon the modification of petroleum gas and coal gas, and the method utilizing the secondary production of hydrogen attendant upon the electrolysis of alkalis. All these operations inevitably require use of facilities of large dimensions.

It is universally known that the reaction between magnesium and water produces hydrogen as illustrated by the following chemical equation.

$$Mg + H_2O \rightarrow Mg(OH)_2 + H_2$$

It is further known to the art as in view of British Pat. No. 579,246, for example, that if magnesium for use in the reaction of the foregoing chemical equation is prepared in the form of a mixture or alloy with such metal as iron, nickel or copper, then the reaction velocity in the direction of the right member of the equation is accelerated and the quantity of hydrogen generated is proportionately increased. The inventors pursued a study with a view to developing a technique for materially increasing the velocity with which hydrogen is generated by this known process for thereby greatly enhancing the feasibility of this simple process. They have consequently accomplished the present invention.

BRIEF SUMMARY OF THE INVENTION:

In the art of generating hydrogen by contact between water and magnesium in the form of a mixture with other metal, this invention relates to composites and mixtures of magnesium with metals capable of inducing extremely vigorous generation of hydrogen as compared with magnesium preparations according to the conventional method, and to a method for the preparation of said mixtures.

To be specific, magnesium composites in the form of plates, foils and particles are obtained by causing one or more finely divided metals selected from the group consisting of iron, zinc, chromium, aluminum and manganese to be attached in an amount in the range of 0.01 to 30% by weight to the surface of magnesium by mechanical pressure. Magnesium mixtures are formed by adding said finely divided metals in an amount of from 0.01 to 30% by weight to molten magnesium, dispersing the added metals therein and thereafter cooling the resultant mixtures. These magnesium composites and magnesium mixtures, upon introduction into water in the presence of one member selected from the group consisting of KCl and NaCl, induce generation of hydrogen with a vigorousness unattainable with the conventional art.

Thus, this invention is directed to providing magnesium composites and magnesium mixtures capable of readily inducing accelerated generation of a large quantity of hydrogen upon contact with water in the presence of one member selected from the group consisting of KCl and NaCl and a method for the manufacture thereof.

Other characteristics and other benefits of this invention will become apparent from the following detailed description of the invention.

DETAILED DESCRIPTION OF THE INVENTION:

The magnesium preparations made of magnesium and one or more metals selected from the group consisting of iron, zinc, chromium, aluminum and manganese according to this invention include magnesium composites which have the aforementioned one or more metals in a finely divided form forcedly attached to magnesium in the form of plates, foils and particles and magnesium mixtures which have the aforementioned metals in a finely divided form dispersed throughout in magnesium. For the purpose of this invention, the terms "iron, zinc, chromium, aluminum and manganese" are defined to include their respective oxides in addition to the metals in their pure form. First, the method for the manufacture of magnesium composites will be described.

The magnesium plates, foils or particles used are not specifically limited in shape. On the other hand, the metals attached to said magnesium plates, foils or particles are required to be in a finely divided form having a particle diameter not larger than 200 mesh. If the metals have a particle diameter larger than 200 mesh, then the produced magnesium composites fail to provide the expected increase in the quantity of hydrogen produced and, therefore, do not prove to be practically advantageous. The desired attachment of the metals in a finely divided form to the magnesium plates, foils or particles is accomplished by placing the magnesium plates, foils or particles in conjunction with said finely divided metals in a container such as, for example, a mortar and agitating the contents 30 to 100 times with a bar such as, for example, a pestle.

The amount of the finely divided metals attaching to the magnesium articles is required to fall in the range of from 0.01 to 30% by weight based on the weight of the magnesium article. In the aforementioned agitation by the use of a bar in the container, the attachment can be attained by placing in the container the finely divided metals in an amount 5 to 100 times as large as the amount required to be attached. Where this attachment is made with respect to magnesium plates or foils, the portion of the finely divided metals which has escaped being attached to the plates or foils can be separated very easily. In the case of magnesium particles, separation of such unattached metals can easily be accomplished by any of the known techniques such as, for example, simple classification using a sieve or centrifugation. It goes without saying that the recovered finely divided metals can be used in their unmodified form for subsequent attachment to the magnesium articles.

Alternatively, the attachment of finely divided metals to magnesium plates or foils can be accomplished by placing the said plates or foils within the finely divided metals and hitting the mixture as with an iron hammer, for example. The attachment contemplated by this invention can also be effected by the same technique as employed in surface abrasion. Since magnesium is a metal abounding in malleability and exhibiting a lower degree of rigidity at normal room temperature than iron, zinc and other metals selected for attachment, the aforementioned treatments can readily attach the finely divided metals to the surface of magnesium articles. Further, the amount of the finely divided metals to be attached to the surface of magnesium articles can easily be regulated by properly fixing the rate of revolution of the bar used for agitation or by suitably selecting the amount of finely divided metals to be placed in the container.

The velocity with which hydrogen is generated is determined by the amount of the finely divided metals to be attached to the surface of magnesium articles.

Since it is easy to regulate the amount, as mentioned above, it is also easy to regulate the velocity.

Now, a description will be given of the method for dispersing the said finely divided metals in molten magnesium. Magnesium melts at 650° C. When magnesium is heated and kept in a molten state and the finely divided metals having a particle diameter not larger than 200 mesh are added to the molten magnesium, the metals are easily dispersed throughout the molten magnesium by any of the ordinary techniques employed for solid solution preparation. By subsequently cooling the mixed system, a magnesium mixture having the desired finely divided metals dispersed therein can be obtained. The magnesium mixtures can be produced in appropriate shape and size by selecting the shape and dimensions of the mold to be used for receiving the molten magnesium. The magnesium mixtures can also be fabricated easily in the shape of ribbons, blocks, etc. Also in these magnesium mixtures, the amount of the finely divided metals contained suffices in the range of from 0.01 to 30% by weight.

Both magnesium composites involving surface attachment of finely divided metals and magnesium mixtures involving dispersion of finely divided metals are effective so far as the amount of metals falls in the range of from 0.01 to 30% by weight based on the magnesium matrix. It has been confirmed that they are sufficiently effective even when the metal's content is of the lowermost order of 0.01 to 2% by weight. When the metals' content does not reach the lower limit 0.01% by weight, they are hardly effective. A metals' content in excess of the upper limit 30% by weight brings about no discernible increase in the effect. Thus, the metals' content has been limited to the range of from 0.01 to 3% by weight, with due consideration paid to practical utility. The fact that the effect aimed at herein can be obtained even when the metals' content based on the magnesium matrix is on an extremely low order of 0.1 to 0.01% is not found in any of the reports published in the prior literature.

It has been known to the art that additional presence of one or more members selected from the group consisting of NaCl, KCl and various similar metal salts leads to an increase in the quantity of hydrogen generated.

The inventor has discovered that the same phenomenon as the above occurs in the case of the present invention.

That is to say, in the present invention, NaCl and KCl are added to the magnesium articles and one or more members selected from the group consisting of various similar metal salts are further added thereto as the result that the velocity with which hydrogen is generated increases by about 20 – 40%. In this case, the metal salts (NaCl, KCl and various similar metal salts) to be used can be attached to or dispersed in the magnesium articles or can be introduced into the water.

Presence of impurities in magnesium iron, zinc, chromium, aluminum and manganese to be used herein has no effect whatever on the quantity of hydrogen to be generated.

River water, city water, sea water and water of other similar sources can be used for generation of hydrogen by contact with the magnesium composites or mixtures of this invention. Sea water is particularly advantageous, because it contains NaCl and other substances and therefore enjoys an enhanced velocity of hydrogen generation.

The magnesium composites and mixtures according to this invention are characterized by their outstanding ability to induce vigorous generation of hydrogen in water of any sort. This characteristic feature is absolutely unknown to the prior art or prior literature. It has been ascertained by gas chromatography utilizing helium, nitrogen and argon as carrier gases that the hydrogen generated by using magnesium composites or mixtures prepared according to this invention has purity exceeding 99.999%.

Magnesium hydroxide ($Mg(OH)_2$) which occurs in consequence of the generation of hydrogen by the use of magnesium composites according to the method of this invention can easily be used cyclically as Mg.

As is clear from the foregoing explanation, the magnesium composites and magnesium mixtures according to this invention enjoy unusually high practical utility, because they readily induce vigorous generation of a large quantity of high-purity hydrogen upon contact with water in the presence of one member selected from the group consisting of NaCl and KCl. If magnesium composites or magnesium mixtures are prepared in advance by the method of this invention, then one can produce a required quantity of hydrogen at any time and place one chooses. After the desired quantity of hydrogen has been obtained, one can discontinue the generation of hydrogen simply by separating the composites or mixtures from water. This method of hydrogen generation, therefore, can be utilized in all fields requiring hydrogen supply.

The present invention will be described more specifically by referring to preferred embodiments and comparative examples, with iron taken as a representative additive metal. Although embodiments involving the use of other additive metals such as zinc, chromium, aluminum and manganese are not specifically illustrated herein, the inventors have confirmed that the same effects are obtained by using these other additive metals. The examples should be interpreted as illustrative and not in a limiting sense.

EXAMPLE 1

In a mortar, 8g of magnesium 50 mesh and 4g of iron 200 mesh were stirred 80 times with a pestle to produce a mixture consisting of magnesium particles having iron powder attached thereto and free iron powder. When this mixture was sieved to separate therefrom the free iron powder which had escaped being attached to the magnesium particles, there was obtained 8.012g of magnesium particles having 0.15% by weight of iron powder attached to the surface thereof. The magnesium particles were combined with 10g of added NaCl and introduced into 1500cc of city water. Consequently, a total of 3600cc (N.T.P.) of hydrogen was generated within 20 minutes. The hydrogen thus generated was found to have purity of 99.999%.

COMPARATIVE EXAMPLE 1

Exactly the same amounts of magnesium particles and iron powder as used in Example 1 were placed in a container and homogeneously blended by gently swirling the contents. The resulting mixture was allowed to react with water under entirely the same conditions as in Example 1. In this case, a total of 40cc (N.T.P.) of hydrogen was generated within 20 minutes.

It is seen from the review of Example 1 and Comparative Example 1 that, when the admixture was effected in the absence of mechanical pressure, the quantity of hydrogen generated was only one-ninetieth of the quantity obtained when the admixture was made in the presence of mechanical pressure. In Comparative Example 1, 4g of iron powder was wholly used for the generation of hydrogen and this amount accounted for 50% by weight based on the amount of magnesium. The comparison shows that the magnesium composite according to this invention had a pronounced effect.

EXAMPLE 2

A ribbon of magnesium measuring 0.3cm in width, 0.02cm in thickness and 12.96cm in length and weighing 0.14439g was placed in a mortar containing 5g of iron and stirred 50 times with a pestle. The ribbon of magnesium was then weighed. The weighing showed that 0.000119g of iron powder had been attached to the ribbon surface. Calculation shows that the amount of iron powder thus attached was about 0.08% by weight.

When this composite ribbon of magnesium was thrown in 400cc of water containing 10g of NaCl, there ensued vigorous generation of hydrogen which lasted for 50 minutes. The rate of hydrogen generation was 4.35 cc/min (N.T.P.). The purity of the hydrogen was found to be 99.999%.

COMPARATIVE EXAMPLE 2

Under exactly the same conditions as in Example 2, a mixture of 0.14439g of magnesium particles 50 mesh with 0.00011g of iron powder (200 mesh) was processed and then tested. In this case, the quantity of hydrogen generated in 30 minutes was 0.7cc (N.T.P.).

It is seen from the review of Example 2 and Comparative Example 2 that the composite ribbon of magnesium according to this invention was quite effective.

Similar results were obtained when the procedure was repeated by using $Na_2SO_4$ or $K_2SO_4$ in place of NaCl.

EXAMPLE 3

A lump of magnesium 1.40g in weight was melted by heating to 750° C. The molten magnesium was thoroughly stirred with 0.11g of iron 400 mesh to have the iron powder dispersed throughout the molten magnesium, then cast in a mold and cooled. Consequently, there was obtained in iron-containing magnesium bar measuring 0.5cm in thickness, 0.3cm in width and 6.0cm in length. When this bar was thrown in 200cc of sea water containing 18.98 mg/lit. of Cl, 10.561 mg/lit. of Na, 1.272 mg/lit. of Mg, 0.884 mg/lit. of S, 400 mg/lit. of Ca and 380 mg/lit. of K, there ensued vigorous generation of hydrogen which lasted for about 180 minutes. The quantity of hydrogen thus generated was 1150cc (N.T.P.).

EXAMPLE 4:

A ribbon of magnesium measuring 3.1mm in width, 0.2mm in thickness and 474mm in length, weighing 0.5321g and having a purity of 99.9% was placed on an iron plate having scattered thereon 50g of iron powder having a particle size not larger than 300 mesh. By rolling a cylinder of steel plate 3.5cm in diameter and 30cm in length so as to press the ribbon lightly, said iron powder was caused to adhere to the ribbon of magnesium. The amount of iron powder thus attached was 0.0051g. When the ribbon of magnesium having the iron powder attached thereto was immersed in 1000cc of sea water, generation of water followed. The relation between the cumulative volume of hydrogen generated and the length of time of the ribbon's immersion in sea water is shown below:

| Time (min.) | 5 | 10 | 15 | 20 | 25 | 30 | 35 | 40 |
|---|---|---|---|---|---|---|---|---|
| Cumulative volume (cc) of hydrogen | 70 45 396 | 135 50 418 | 185 55 440 | 232 60 451 | 272 | 304 | 336 | 364 |

This rate of hydrogen generation is unusually large as compared with that obtainable with the known method.

EXAMPLE 5

A ribbon of magnesium measuring 3mm in width, 0.2mm in thickness and 475mm in length, weighing 0.5339g and having a purity of 99% was placed in ferric oxide powder. The ribbon of magnesium was moved around in the powder by virtue of strong pressure applied thereto with a cylinder of steel plate 3.5cm in diameter and 30cm in length. Consequently, 0.0002g of the ferric oxide powder was caused to adhere to the ribbon of magnesium. When the ribbon of magnesium having the ferric oxide powder attached thereto was immersed in 1000cc of sea water, hydrogen was generated as follows:

| Length of time (min.) | 10 | 20 | 30 | 40 | 50 | 60 | 70 | 80 |
|---|---|---|---|---|---|---|---|---|
| Cumulative volume of hydrogen (cc) | 85 | 165 | 228 | 298 | 357 | 404 | 438 | 465 |

This rate of hydrogen generation is unusually large as compared with that obtainable with the known method.

We claim:

1. A method for the manufacture of a magnesium mixture capable of inducing generation of hydrogen upon reaction with water in the presence of one member selected from the group consisting of NaCl and KCl, which method is characterized by melting magnesium, adding to the molten magnesium 0.01 to 30% by weight based on magnesium of an iron-containing powder selected from the group consisting of iron and iron oxide powder having a particle diameter not larger than 200 mesh; dispersing the iron-containing powder in the molten magnesium; and thereafter cooling the resultant mixture.

2. A method according to claim 1, wherein the amount of the iron-containing powder dispersed is 0.01 to 2.0% by weight.

* * * * *